United States Patent [19]

Marbaker et al.

[11] Patent Number: 5,229,988
[45] Date of Patent: Jul. 20, 1993

[54] SYSTEM AND METHOD FOR DISTINGUISHING PROXY REPLIES OF INTERCONNECTING DEVICES FROM DUPLICATE SOURCE ADDRESS REPLIES OF NON-INTERCONNECTING DEVICES ON A NETWORK

[75] Inventors: William R. Marbaker, Colorado Springs; Scott Godlew, Fort Collins; Thomas S. Wisdom, Jr., Colorado Springs, all of Colo.

[73] Assignee: Hewlett-Packard Company, Palo Alto, Calif.

[21] Appl. No.: 823,274

[22] Filed: Jan. 21, 1992

[51] Int. Cl.⁵ .................................................. H04J 3/14
[52] U.S. Cl. ..................................... 370/13; 370/94.1; 340/825.52; 371/7; 371/18
[58] Field of Search ................... 370/94.1, 13, 85.7; 371/7, 11.1-11.3, 18, 72; 340/825.52

[56] References Cited

U.S. PATENT DOCUMENTS

| | | | |
|---|---|---|---|
| 4,546,467 | 10/1985 | Yamamoto | 370/13 |
| 4,825,204 | 4/1989 | Nakamura | 340/825.52 |
| 5,159,592 | 10/1992 | Perkins | 370/94.1 X |

Primary Examiner—Douglas W. Olms
Assistant Examiner—Russell W. Blum
Attorney, Agent, or Firm—Guy J. Kelley

[57] ABSTRACT

System and method for distinguishing duplicate source address replies caused by interconnecting devices connected to a local area network and duplicate source address replies caused by non-interconnecting devices connected to the local area network.

The present invention may be implemented through an analyzer. The method includes the following steps: In step 1, the present invention sends a first Address Resolution Request packet for a first Internet Protocol target address. In step 2, all Internet Protocol source address responses replying to the first Address Resolution Request packet are catalogued in a first reply set. In step 3, a second Address Resolution Request packet for a second Internet protocol target address is sent on to the network. In step 4, all Internet Protocol source address responses replying to said second Address Resolution Request packet are catalogued in a second reply set. In step 5, the first reply set is intersected with the second reply set resulting in an intersection set. In step 6, subtracting the first reply set from the intersection set to determine if there are any unique responders.

15 Claims, 9 Drawing Sheets

SYSTEM AND METHOD FOR DISTINGUISHING PROXY REPLIES OF INTERCONNECTING DEVICES FROM DUPLICATE SOURCE ADDRESS REPLIES OF NON-INTERCONNECTING DEVICES ON A NETWORK

BACKGROUND OF THE INVENTION

1. Field of the Invention

The present invention relates to local area networks. More particularly, the present invention relates to a system and method for testing whether duplicate address responses are proper.

2. Related Art

It is common for computers operating on a local area network (LAN) or similar environment to acquire data files from other computers located on the LAN. For example, three computers (not shown), a computer A, a computer B, and a computer C may operate on the same LAN (not shown). A user operating computer C may receive data from computer A. In conventional LAN systems a source address will then be encoded in the data received from computer A. Computer A's source address will remain encoded in the data that computer C has acquired. However, when computer C later communicates using the data it received from computer A on the LAN to another computer B, for instance, it will appear to computer B and any other device monitoring the LAN that computer A is communicating to computer B. Whereas, in reality, computer C is talking to computer B.

In order to solve this problem, network managers monitor and test the LAN or interconnected LANs for devices using duplicate source addresses. However, when network managers monitor a LAN with interconnecting devices connected to the LAN (such as routers and gateways, which connect networks), the network manager is unable to distinguish between proxy address replies (to be described below) of interconnecting devices and two or more computers with duplicate source addresses.

A conventional approach used to solve this problem will be described with reference to FIG. 1. FIG. 1 shows a representative block diagram of a multiple interconnected network system 101. The system 101 has a network analyzer 102, a LAN 104, nodes 106, 108 and 110, routers 112 and 114, an internet environment 116 and stations 118 and 120. The stations 118 and 120 may comprise further LANs, nodes, or the like.

The multiple interconnected network system 101 uses Address Resolution Protocol (ARP). ARP allows nodes 106-110 to find one another via Internet Protocol (IP) addressing in an internet environment 116 in a conventional fashion familiar to those skilled in the art. For example, when node 106 on the LAN 104 attempts to find node 108 using the LAN 104, node 106 sends an ARP request packet on to the LAN 104.

A simplified representation of an ARP request packet 201, is shown in FIG. 2A. The ARP request packet 201 is sent out on the LAN 104 to all devices located on the LAN 104. Every device looks at the ARP request packet 201 via address 202 and discards the ARP request packet 201 unless specifically identified by an IP target address 208. The IP source address 206 identifies which device sent the ARP request packet 201.

In this example, node 106 would attempt to find node 108 by sending an ARP request packet 201 containing an IP target address 208 for node 108. Only node 108 should respond to this ARP request packet 201 by sending a reply packet.

A simplified representation of a reply packet 211 is shown in FIG. 2B. The reply packet 211 contains node 106's IP destination address 218 with node 108's IP source address 216.

If node 108 and node 110 had responded to the IP target address 208 of node 106, the network analyzer 102 would suspect a problem, since duplicate IP source addresses 216 of node 108 would be sent by both node 108 and node 110. At the IP address layer, it is not possible to determine which device is node 108. Therefore, network analyzer 102 would need to evaluate the two reply packets 203 sent by node 108 and node 110 by examining the Ethernet address (physical layer address) 214 of the reply packets 211.

The physical layer source addresses 204 and 214 of packets 201 and 211 provide unique identifiers of particular hardware device (node 106 and node 108, respectively). Most devices do not monitor the physical layer address of packets. As a consequence, the physical layer address is not well cataloged and is often difficult to locate within a network.

Interconnecting devices such as routers 112 and 114 may also use duplicate IP source addresses 216 when replying to an ARP request packet 201 of a particular node 106-110. These replies also appear as a duplicate IP source address problem to the network analyzer 102. However, this is a standard, non-problematic response, and is not caused by more than one node having duplicate IP source addresses.

For instance, routers 112 and 114 are both configured to operate with proxy ARP. Proxy ARP allows nodes 106-110 to find stations 118 and 120 in an internet environment 116. For example, when node 108 attempts to contact station 118 by sending an ARP request packet 201 on to the LAN 104, routers 112 and 114 will respond in proxy for station 118. In other words, routers 112 and 114 act as an agent for station 118, which may be located on a different network than nodes 106-110. Router 112 and router 114 will both send an IP source address reply 216 in proxy for station 118. Node 118 will establish contact with whichever router 112 or 114 first responds to node 108's ARP request for an IP target address 208 of station 118.

In this example, the network analyzer 102 receives two reply packets 211 with an IP source address 216, of target 118 from node 108's ARP request packet 201. Network analyzer 102 interprets the replies as an indication that two hardware devices, router 112 and router 114, are using the same IP source address 216 (that of station 118) when routers 112 and 114 reply in proxy.

A network manager would classify this example as a "ribald rogue router reply." The term "ribald rogue router reply" symbolizes a crude, mischievous joke performed by routers 112 and 114 (or any interconnecting device) on the network analyzer 102, by making the network analyzer 102 believe there is a duplicate IP source address problem when there actually is no problem.

In order to eliminate the replies from the routers 112 and 114 which are not the result of a duplicate IP source address problem, the network analyzer 102 implements the conventional solution explained above (looking at the ARP packet request 201 and the reply packet 211 to determine their physical layer address). Attempts to extrapolate physical addresses 204 and 214 from packets 201 and 211 given a large number of suspected duplicate IP source addresses, can be difficult if not impossible to resolve. As a result of this process, many false alarms are sent by the network analyzer 102 warning of a duplicate IP source address situation when there actually is no problem (a ribald rogue router). When there actually is a real duplicate IP address problem, the network manager is typically unable to locate an often elusive physical address. Consequently, the problem is not corrected promptly and efficiently.

What is needed is a system and method able to distinguish ribald rogue router (or similar interconnecting device) replies from duplicate IP address replies.

SUMMARY OF THE INVENTION

The present invention distinguishes proxy replies caused by interconnected devices from duplicate source address replies of non-interconnecting devices. The present invention is a system and method and may be implemented by means of an improved network analyzer. The operation of the present invention includes the following steps:

In step 1, the present invention sends a first Address Resolution Request packet for a first Internet Protocol target address. In step 2, all Internet Protocol source address responses replying to the first Address Resolution Request packet are catalogued in a first reply set. In step 3, a second Address Resolution Request packet for a second Internet protocol target address in close proximity to the first Internet Protocol target address, is sent on to the network. In step 4, all Internet Protocol source address responses replying to said second Address Resolution Request packet are catalogued in a second reply set. In step 5, the first reply set is compared to the second reply set to determine if there are any unique responders. If there are no unique responders an interconnecting device is identified as sending the duplicate source address. If there is a unique responder, then a duplicate source address reply of non-interconnecting devices is identified by the novel network analyzer indicating a possible problem.

The present invention solves the problem of distinguishing between rogue router replies and duplicate source addresses for different devices. In other words, the present invention, eliminates incorrect (false) reports of serious duplicate address problems. The present invention accomplishes this result irrespective of obscure physical addressing or whether a router is producing the duplicate source address or a node is producing the duplicate source address. This eliminates the need of a network manager having to utilize a complicated means of looking at interconnecting devices when it receives duplicate source addresses.

Another feature of the present invention is its convenience. The present invention does not require the pre-existing knowledge of the presence of any type of interconnector device, such as a router. This allows generic implementation of the present invention to multiple networks with automatic adaptability. Whereas prior devices were not generic and had to be programmed and reprogrammed each time they were connected to a new network.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings, wherein.

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention is directed to a system and method for determining whether duplicate address responses are proper.

Figure 1:
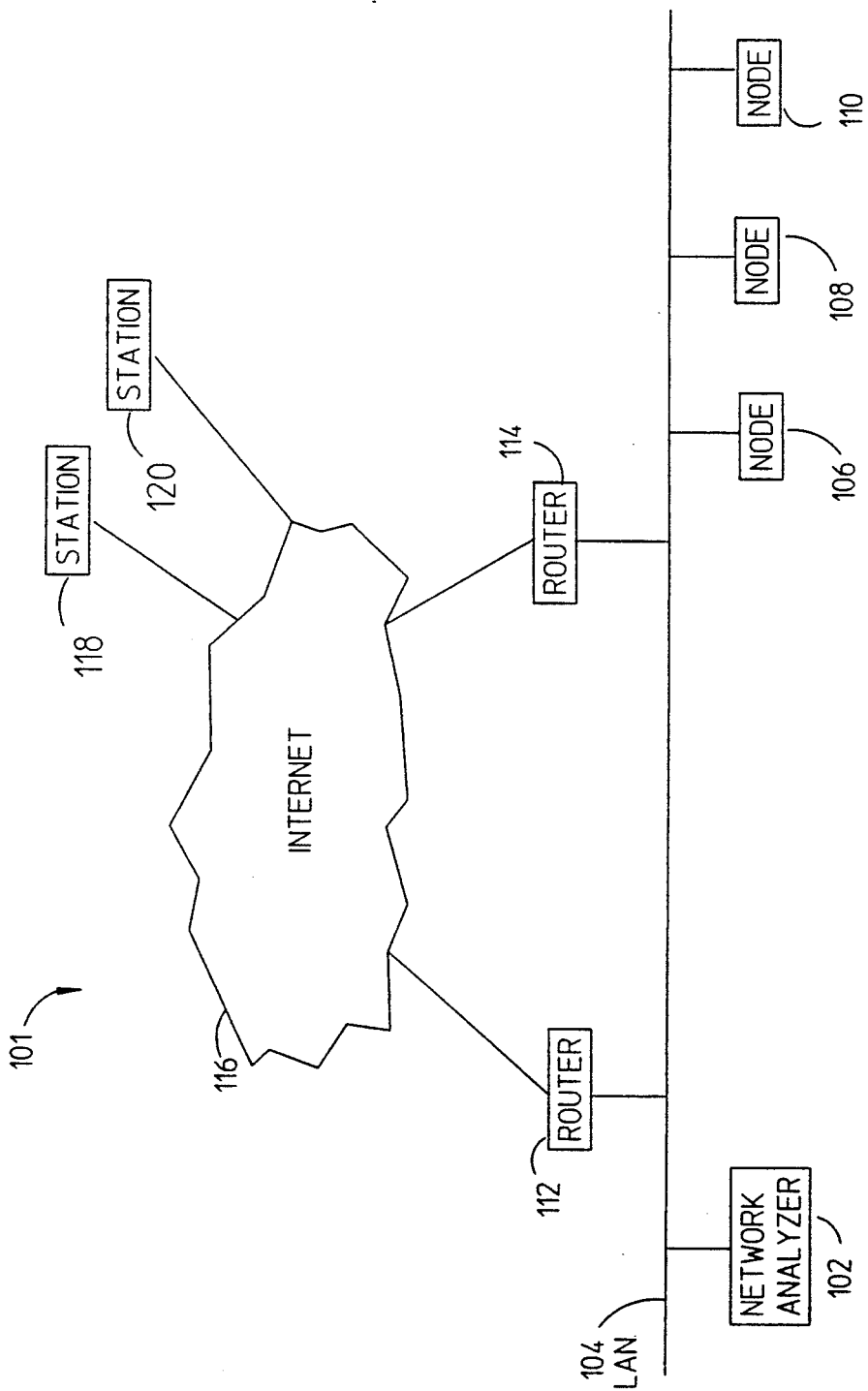
FIG. 1 illustrates a representative block diagram of a multiple interconnected network system 101.
Figure 2A:
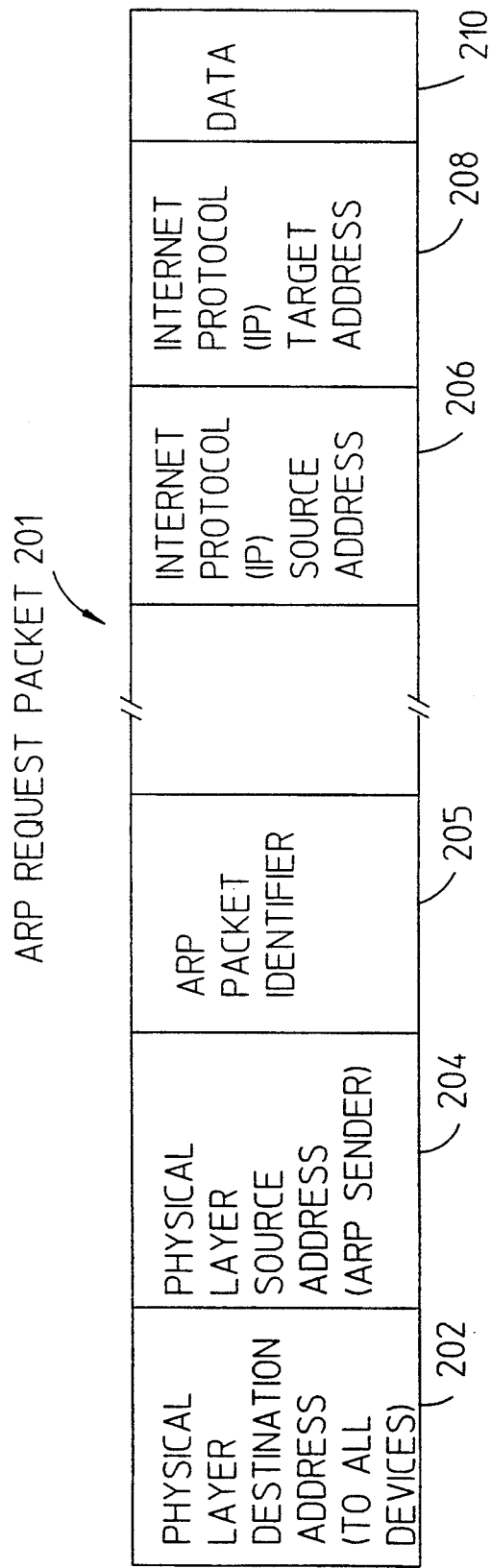
FIG. 2A illustrates an ARP request packet sent on a LAN.
Figure 2B:
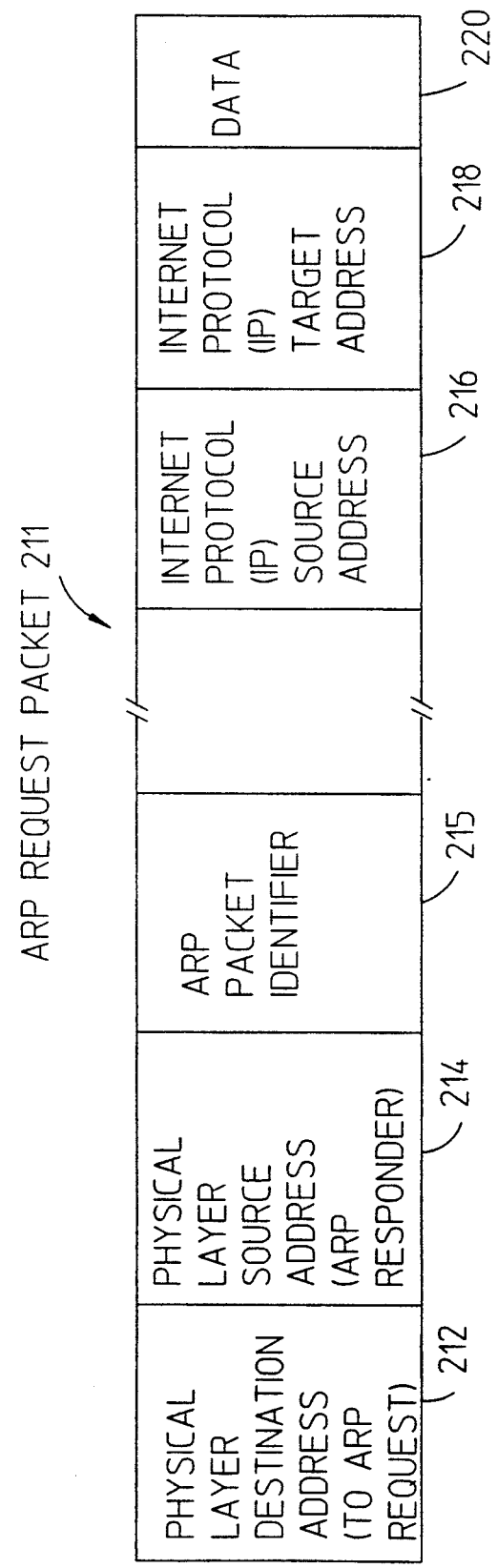
FIG. 2B illustrates an ARP reply packet sent on a LAN.
Figure 3:
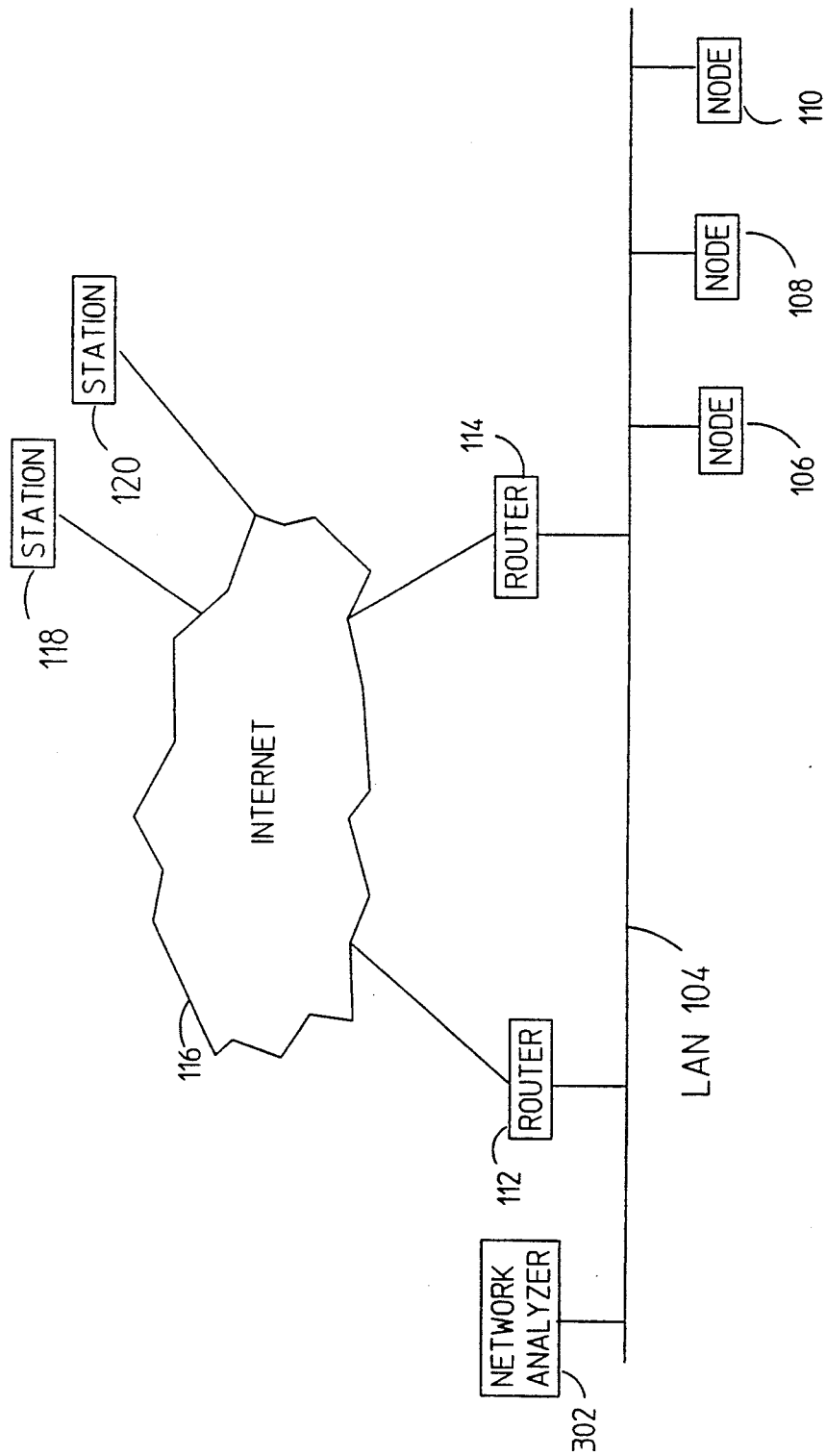
FIG. 3 illustrates a block diagram of an environment of which the present invention operates.

FIG. 3 illustrates a block diagram of an environment in which an improved network analyzer 302 of the present invention (analyzer 302) operates. FIG. 3 is identical to FIG. 1 with the exception of the improved analyzer 302.

Figure 4:
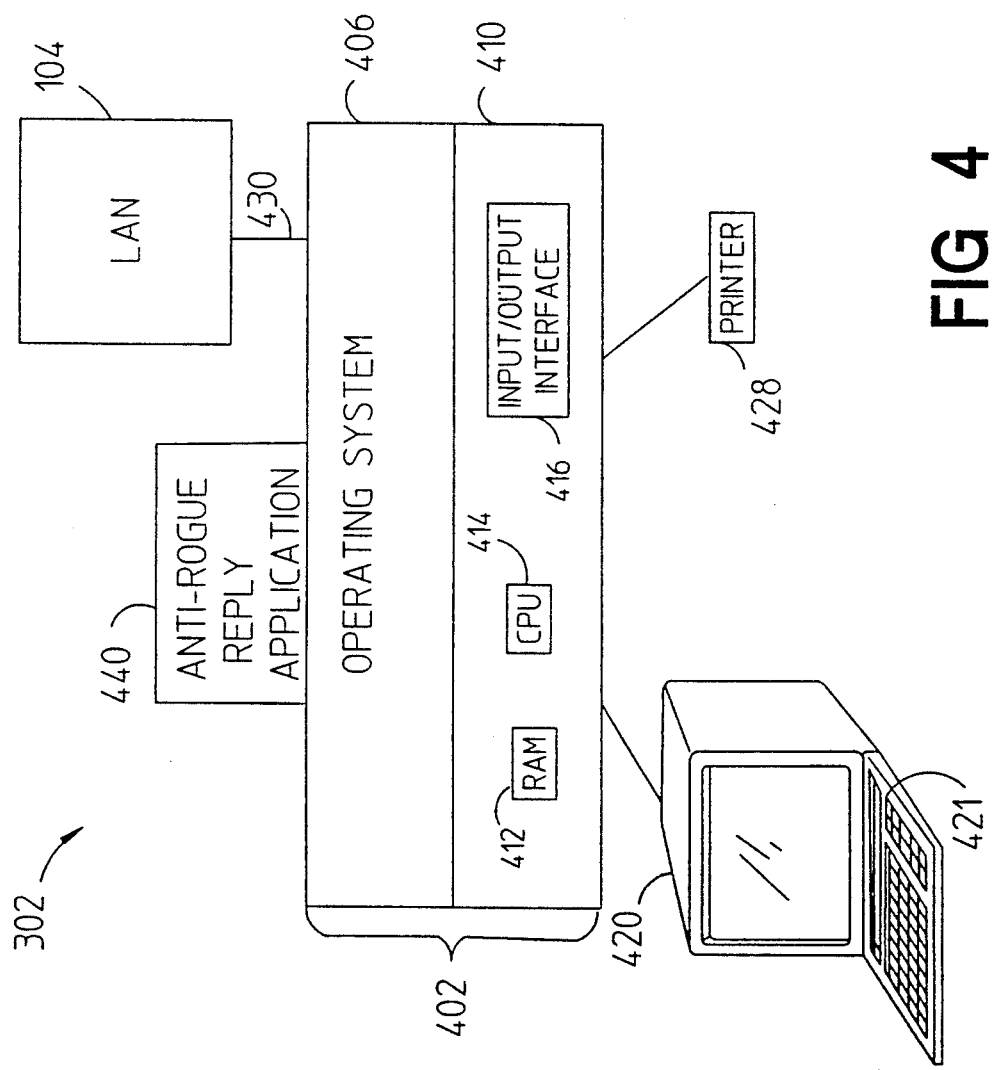
FIG. 4 illustrates a block diagram of a novel network analyzer according to the present invention.

FIG. 4 illustrates a block diagram of analyzer 302 according to the present invention. Analyzer 302 comprises a computer unit 410, having a central processing unit (CPU) 414, a random access memory (RAM) 412, and an input/output interface 416. The RAM 412 is also called a main memory and may include any type of readable or writable memory. Analyzer 302 also includes an anti-ribald rogue reply application 440 which, in one embodiment, comprises a software application running on an operating system 406 of analyzer 302. The anti-rogue reply application functions via the analyzer 302 for distinguishing between duplicate source address replies of non-interconnecting devices connected to the LAN 104 and duplicate source address proxy replies from interconnecting devices connected to the LAN 104, via a bus 430.

Various peripheral components may be connected to analyzer 302, such as a terminal 420 and a printing device 428. Network managers may interact with the analyzer 302 via the terminal 420.

In one preferred embodiment of the present invention, the computer 410 and operating system 406 are comprised of a Hewlett-Packard HP 4980 Series 900 architecture with a "smalltalk" environment running on IBM compatible personal computer architecture utilizing an MS-DOS operating system. As will become evident to those skilled in the art, the functionability of the anti-rogue reply application 440 may be handled by the instrument operating environment 406 itself.

1. No Duplicate IP Source Address Problem.

Figure 5:
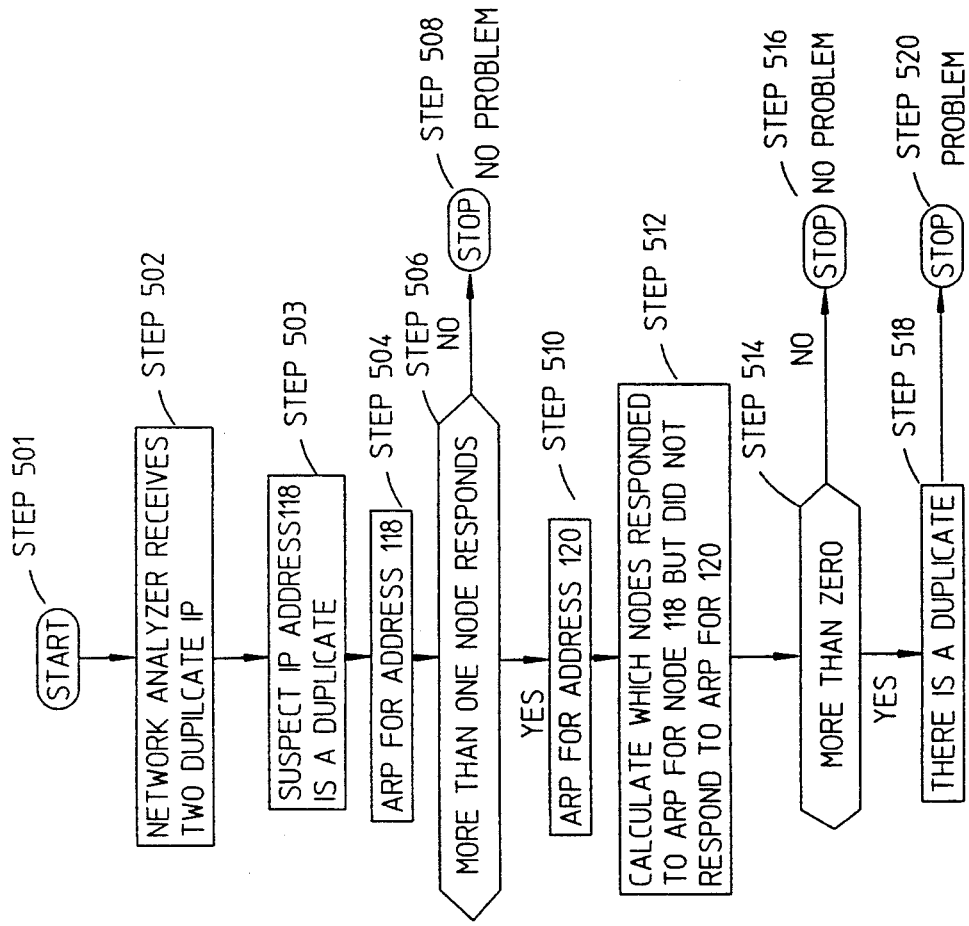
FIG. 5 is a flow chart illustrating an operation of the present invention with no duplicate IP source address problem.

The operation of analyzer 302 according to the present invention is illustrated in the flow chart shown in FIG. 5. With reference again to FIG. 3, the flow chart of FIG. 5 represents an example of node communication with node 106 attempting to communicate with station 118. Node 106 will try to find station 118 by sending an ARP request over the LAN 104. This example typifies a "ribald rogue router reply" discussed in the background section above. The system and method of the present invention are, however, not limited to routers, but may also be employed with other interconnecting devices, such as gateways, or the like. Such interconnecting devices allow different networks to communicate with one another.

Referring to FIG. 5, in step 502 the analyzer 302 receives two duplicate IP source address frames (frame and packet is synonymous) from routers 112 and 114. In step 503, the analyzer 302 suspects a duplicate IP address problem because it received duplicate IP source addresses 216 of station 118, from routers 112 and 114 replying in proxy for station 118.

In step 504, the analyzer 302 ARPs for a suspected duplicate IP source address. In this case, analyzer 302 sends an ARP request packet 201 with an IP target address 208 for station 118.

In step 506, the analyzer 302 confirms whether a duplicate IP source address problem exists. If less than two devices respond to the ARP request of step 504, then there is no duplicate IP source address problem and the analyzer 302 will stop, as shown in step 508. In this example, analyzer 302 receives a reply packet with duplicate IP source addresses 216 of station 118 from router 112 and router 114. Thus, the "YES" branch of step 506 is taken. This IP source address response is then grouped in a first reply set 602 shown in FIG. 6. The first reply set 602 is stored within the RAM 412 of the analyzer 302, as shown in FIG. 4.

Figure 6:
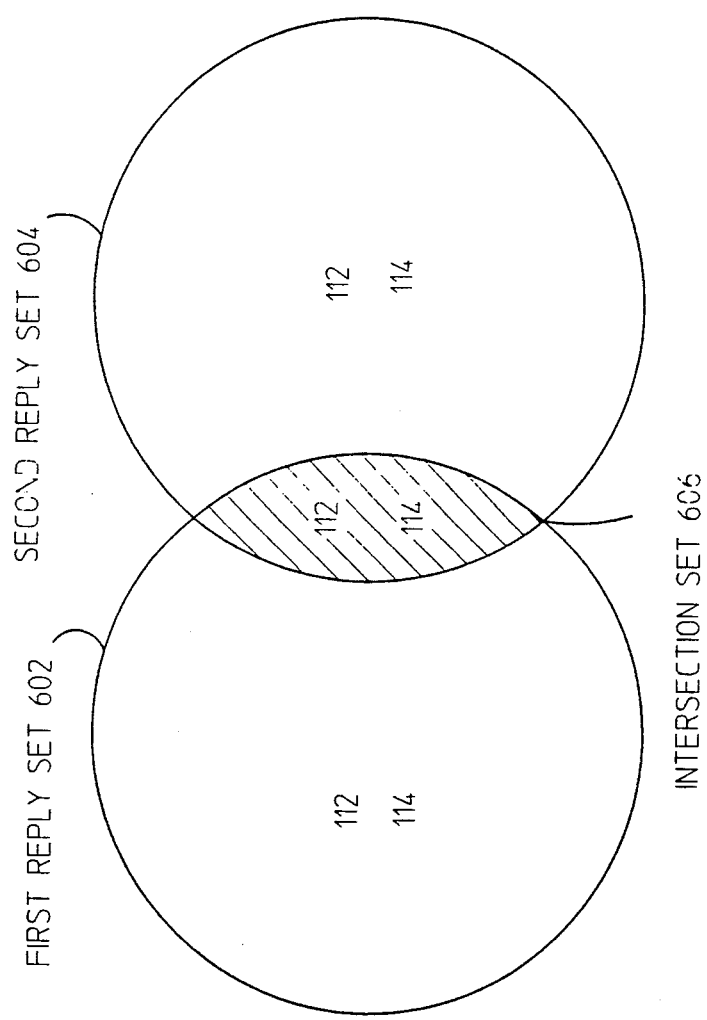
FIG. 6 illustrates a two set diagram of the present invention.

In step 510, analyzer 302 ARPs for a second station in close proximity to station 118. In this example, analyzer 302 sends an ARP request packet 201 with an IP target address 208 for a station 120. Both router 112 and router 114 will respond to this ARP request, because both routers think they know where station 120 is located, irrespective of whether or not station 120 exists. This response is grouped in a second reply set 604, as shown in FIG. 6. The second reply set 604 consists of router 112 and router 114. Like the first reply set 602, the second reply set 604 is located in the RAM 412 of the analyzer 302 shown in FIG. 4.

In step 512, analyzer 302 performs an analysis on reply sets 602 and 604 to determine if there are any common responders. This is performed by an intersection set function. The intersection set 606 in this scenario is represented by a "rogue router set" 606 (rogue gateway or any interconnecting device). (Rogue router set = Reply set 602 ∩ Reply set 604.) Thus, the intersection of set 602 and 604 is the rogue router set 606. In this example, the rogue router set 606 includes common responses to both sets 602 and 604.

In an alternative embodiment, the second reply set 604 does not need to be stored in memory (RAM 412) of analyzer 302. Instead, analyzer 302 can simultaneously intersect the second reply set 604 with the first reply set 602, immediately upon receiving the second reply set 604. This eliminates a storing step thereby increasing the speed of the analyzer 302.

In step 514, analyzer 302 subtracts the rogue router set 606 from the first reply set 602. The set of unique responders consist of the first reply set 602 minus the rogue router set 606. There is no problem if the unique responder set is empty. In this example there is no problem because the unique responder is empty: in set notation (0=(112, 114)−(112, 114)). Thus, there is no duplicate IP address problem in this example. In step 516 the analyzer 302 stops.

2. Example of a Duplicate IP Source Address Problem.

Figure 7:
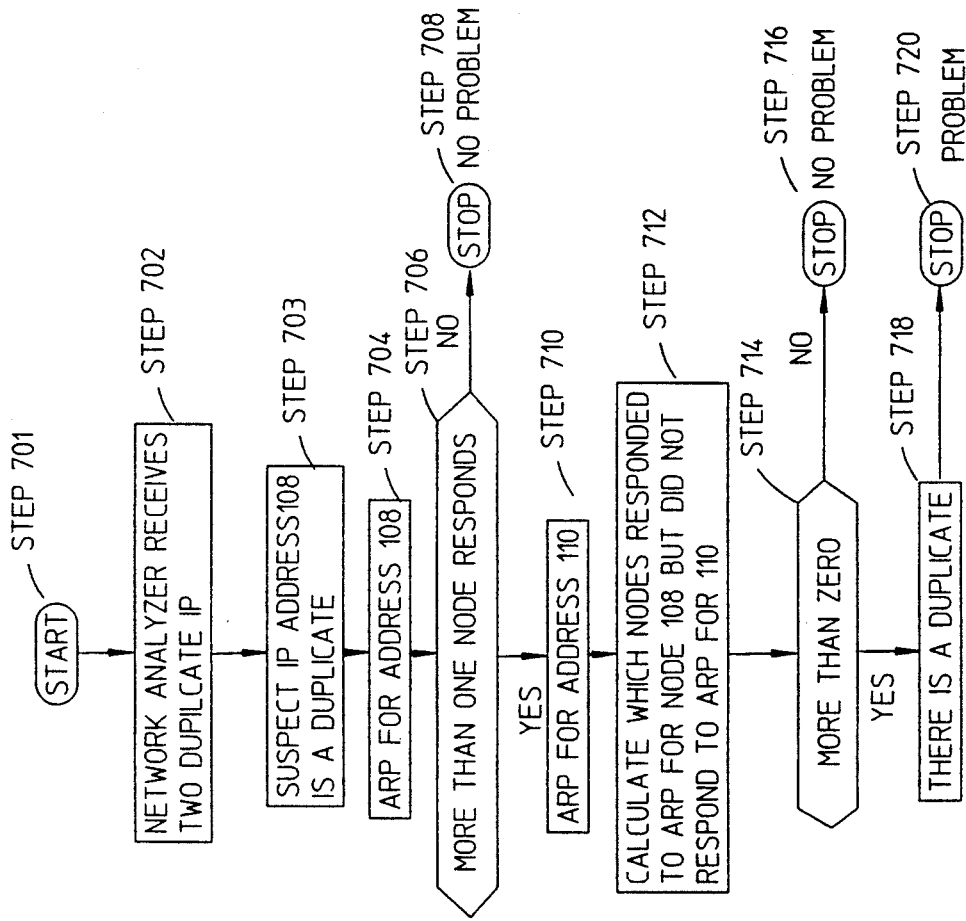
FIG. 7 is a flow chart illustrating an operation of the present invention with an example of a duplicate IP source address problem.

FIG. 7 illustrates a flow chart representing the operation of the present invention with a duplicate IP source address problem. In this example, node 106 sends an ARP request packet 201 with an IP target address 208 for node 108. However, both node 108 and 110 answer with reply packets 211 encoded with identical IP source addresses 216 of node 108.

In step 702, analyzer 302 also receives two duplicate IP addresses from two nodes 108 and 110. Therefore, in step 703, analyzer 302 suspects that two duplicate IP source addresses 216 exists. In step 704, in order to confirm the suspicion of step 703, analyzer 302 performs an ARP request. Analyzer 302 sends an ARP request packet 201 with an IP target address 208 for node 108.

Figure 8:
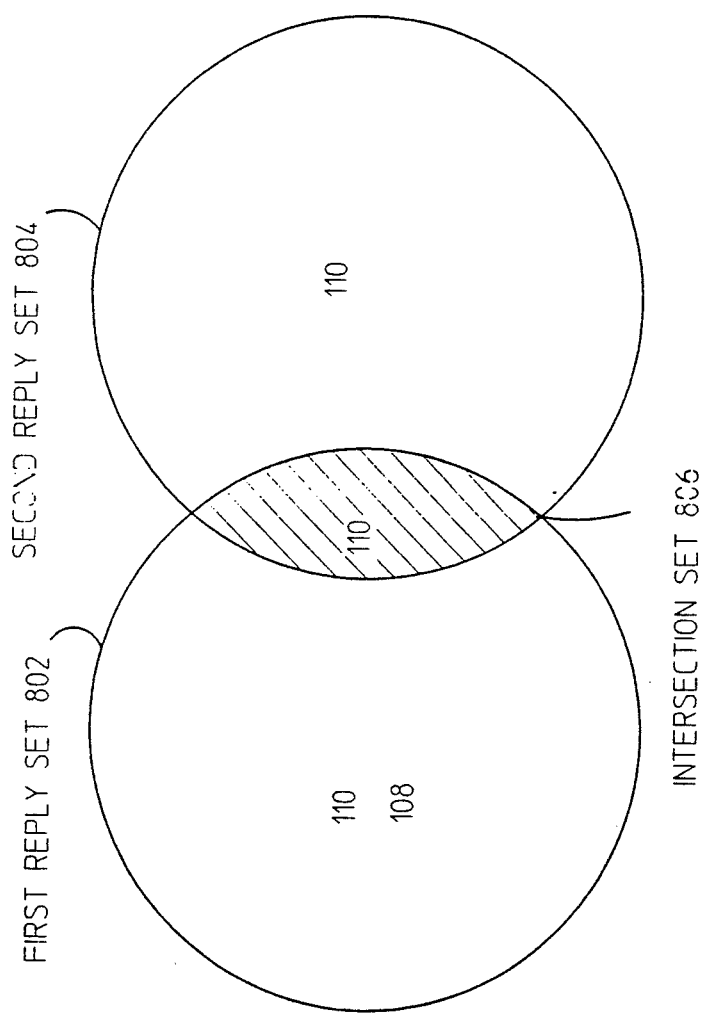
FIG. 8 illustrates a two set diagram of the present invention.

In step 706, analyzer 302 determines if more than one node responded to the ARP request packet 201 of step 704. If analyzer 302 received more than one reply packet 211 in response to step 704 the analyzer 302 confirms that there is a duplicate IP address source address 216. Analyzer 302 then catalogues any replies to the ARP request packet 201 for an IP target address 208 of node 108 in a first reply set 802 as shown in FIG. 8.

In step 710, analyzer 302 ARPs for a node in close proximity to node 108. In this example, analyzer 302 sends an ARP request packet 201 with an IP target address 208 for a node 110. Only node 110 responds in this example. This response is grouped in a second reply set 804 of FIG. 8.

In step 712, analyzer 302 performs an analysis on sets 802 and 804 to determine if there were any unique responders. This is performed by a set intersection function which will leave an intersection set (rogue router) set 806. (Rogue router set = Reply set 802 ∩ Reply set 804). Thus, the intersection set 806 is equal to the set which responded to both ARP requests for node 108 and node 110. In this example the rogue router set 806 is node 110.

In step 714, analyzer 302 subtracts any responses which are common to both sets 802 and 804. In other words, analyzer 302 subtracts the intersection set 806 from reply set 802 to arrive at a unique responder value. (Unique responders = reply set 804 − intersection set 806). There is a problem, however, if the unique responder is greater than zero. In this example there would be a problem because the Unique Responder would not equal zero: in set notation (0≠(108,110)−(110)). Thus, in a step 718, analyzer 302 would conclude that there is a duplicate IP source address 216 problem for node 108. The network manager (i.e., human operator) can then assign a new (unique) address to one of the devices, which replied to the first reply set 802. Alternatively, address assignment could be changed by analyzer 302 using a priority scheme, look-up table, or the like.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for monitoring a local area network and distinguishing proxy replies of interconnecting devices from duplicate source address replies of non-interconnecting devices, said method performed by a network analyzer device connected to the local area network, said method comprising the steps of:
   (1) receiving at least two reply packets having a duplicate source address;
   (2) sending a first packet having a first target address identical to said duplicate source address;
   (3) storing any reply packet responding to said first packet in a first reply set;
   (4) sending a second packet having a second target address, said second target address being in close address proximity to said first target address;
   (5) receiving a second reply set of zero or more reply packets in response to said second packet; and
   (6) determining if there are any unique reply packets not common to said first and second reply sets.

2. A method according to claim 1, wherein said step (6) further comprises the steps of:
   intersecting said first and second reply sets to thereby generate a result;
   subtracting said result from said first reply set to thereby generate a further result;
   indicating that one or more proxy reply from an interconnecting device have been detected if said further result is equal to zero; and
   indicating that a duplicate source address reply of a non-interconnecting devices has been detected if said further result is not equal to zero.

3. A method according to claim 1, wherein said method further comprises the step of storing said second reply set before performing said step (6).

4. A method according to claim 1, further comprising the step of continuing to monitor the local area network if there are no reply packets in response to said step (2).

5. A method according to claim 1, wherein said first packet is an Address Resolution Request packet.

6. A method according to claim 1, wherein said first target address is an Internet Protocol target address.

7. A method according to claim 1, wherein said second packet is an Address Resolution Request packet.

8. A method according to claim 1, wherein said second target address is an Internet Protocol target address.

9. A system for monitoring a local area network and distinguishing proxy replies of interconnecting devices from duplicate source address replies of non-interconnecting devices, said system comprising:
   (a) means for receiving at least two reply packets having a duplicate source address;
   (b) means for sending a first packet having a first target address identical to said duplicate source address;
   (c) means for storing any reply packet responding to said first packet in a first reply set;
   (d) means for sending a second packet having a second target address, said second target address being in close address proximity to said first target address;
   (e) means for storing any reply packet responding to said second packet in a second reply set; and
   (f) means for determining if there are any unique reply packets not common to said first and second reply sets.

10. A system according to claim 9, wherein said means for determining step further comprises:
   (i) means for intersecting said first and second reply sets to thereby generate a result;
   (ii) means for subtracting said result from said first reply set to thereby generate a further result;
   (iii) means for indicating that one or more proxy replies from an interconnecting device have been detected if said further result is equal to zero; and
   (iv) means for indicating that a duplicate source address reply of a non-interconnecting devices has been detected if said further result is not equal to zero.

11. A system according to claim 9, wherein said means form part of a network analyzer.

12. A system according to claim 9, wherein said first packet is an Address Resolution Request packet.

13. A system according to claim 9, wherein said first target address is an Internet Protocol target address.

14. A system according to claim 9, wherein said second packet is an Address Resolution Request packet.

15. A system according to claim 9, wherein said second target address is an Internet Protocol target address.

* * * * *